United States Patent
Thallam Kodandaramaih et al.

(10) Patent No.: US 11,379,433 B2
(45) Date of Patent: Jul. 5, 2022

(54) PERSISTENT VERSION STORAGE FOR RELATIONAL DATABASE MANAGEMENT SYSTEM

(71) Applicant: Microsoft Technology Licensing, LLC, Redmond, WA (US)

(72) Inventors: Raghavendra Thallam Kodandaramaih, Redmond, WA (US); Peter Byrne, Charlotte Hall, MD (US); Hanumantha Rao Kodavalla, Sammamish, WA (US); Wei Chen, Sammamish, WA (US); Girish Mittur Venkataramanappa, Redmond, WA (US); Adrian-Leonard Radu, Redmond, WA (US); Panagiotis Antonopoulos, Redmond, WA (US); Varun Kunjbihari Tibrewal, Newark, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 16/112,523

(22) Filed: Aug. 24, 2018

(65) Prior Publication Data
US 2019/0361997 A1 Nov. 28, 2019

Related U.S. Application Data

(60) Provisional application No. 62/676,868, filed on May 25, 2018.

(51) Int. Cl.
*G06F 16/00* (2019.01)
*G06F 16/21* (2019.01)
(Continued)

(52) U.S. Cl.
CPC ............ *G06F 16/21* (2019.01); *G06F 16/122* (2019.01); *G06F 16/211* (2019.01);
(Continued)

(58) Field of Classification Search
CPC ............... G06F 16/284; G06F 16/2282; G06F 16/2379; G06F 16/22; G06F 16/27;
(Continued)

(56) References Cited

U.S. PATENT DOCUMENTS

| | | | | |
|---|---|---|---|---|
| 5,446,887 A | * | 8/1995 | Berkowitz | .......... G06F 16/9027 |
| 9,305,046 B2 | * | 4/2016 | Bhattacharjee | ..... G06F 16/2329 |

(Continued)

FOREIGN PATENT DOCUMENTS

| | | |
|---|---|---|
| EP | 1480132 A2 | 11/2004 |
| EP | 2660735 A1 * | 11/2013 |

(Continued)

OTHER PUBLICATIONS

"Recommendations to reduce allocation contention in SQL Server tempdb database", Retrieved from: https://support.microsoft.com/en-us/help/2154845/recommendations-to-reduce-allocation-contention-in-sql-server-tempdb-d, Retrieved Date: Mar. 23, 2018, 3 Pages.

(Continued)

*Primary Examiner* — Srirama Channavajjala
(74) *Attorney, Agent, or Firm* — Ray Quinney & Nebeker; Tiffany Healy

(57) ABSTRACT

A relational database system that implements persistent version storage may include an in-row module that is executable by one or more processors to implement an in-row scheme by storing in-row previous version information within a payload of a row within a database page. The relational database system may additionally include an off-row module that is executable by the one or more processors to implement an off-row scheme by storing off-row previous (Continued)

version information in an off-row page that is separate from the database page. The relational database system may additionally include a storage policy that defines when previous version information is stored in accordance with the in-row scheme and when the previous version information is stored in accordance with the off-row scheme. The relational database system may additionally include a cleanup module that cleans up older versions when they are deemed unnecessary by the system.

18 Claims, 14 Drawing Sheets

(51) Int. Cl.
　　*G06F 16/28*　　(2019.01)
　　*G06F 16/22*　　(2019.01)
　　*G06F 16/23*　　(2019.01)
　　*G06F 16/11*　　(2019.01)
　　*G06F 16/27*　　(2019.01)

(52) U.S. Cl.
　　CPC ........ *G06F 16/217* (2019.01); *G06F 16/2282* (2019.01); *G06F 16/2379* (2019.01); *G06F 16/27* (2019.01); *G06F 16/284* (2019.01)

(58) Field of Classification Search
　　CPC .... G06F 6/122; G06F 16/217; G06F 16/0649; G06F 16/211; G06F 16/21–22; G06F 16/2255; G06F 3/061; G06F 3/0653; G06F 3/0604; G06F 3/065
　　USPC ........................................................ 707/694
　　See application file for complete search history.

(56) References Cited

U.S. PATENT DOCUMENTS

| | | | | |
|---|---|---|---|---|
| 9,483,517 | B2* | 11/2016 | Raja | G06F 16/2365 |
| 9,798,618 | B2* | 10/2017 | Chambliss | G06F 11/1451 |
| 10,296,615 | B2* | 5/2019 | Diaconu | G06F 16/2379 |
| 10,496,302 | B1* | 12/2019 | Gaurav | G06F 3/062 |
| 10,922,296 | B2* | 2/2021 | Gurajada | G06F 11/1471 |
| 2005/0071390 | A1* | 3/2005 | Midgley | G06F 11/1464 |
| 2010/0218177 | A1* | 8/2010 | Miura | G06F 8/65 717/170 |
| 2010/0287143 | A1* | 11/2010 | Di Carlo | G06F 16/217 707/693 |
| 2011/0213766 | A1* | 9/2011 | Hong | G06F 16/284 707/718 |
| 2011/0252000 | A1* | 10/2011 | Diaconu | G06F 16/219 707/812 |
| 2012/0084274 | A1* | 4/2012 | Renkes | G06F 16/332 707/703 |
| 2012/0323971 | A1* | 12/2012 | Pasupuleti | G06F 16/217 707/802 |
| 2013/0110783 | A1* | 5/2013 | Wertheimer | G06F 11/14 707/646 |
| 2013/0166554 | A1* | 6/2013 | Yoon | G06F 16/283 707/737 |
| 2014/0095432 | A1* | 4/2014 | Trumbull | G06F 16/213 707/610 |
| 2015/0039559 | A1 | 2/2015 | Bhattacharjee et al. | |
| 2015/0227521 | A1* | 8/2015 | Levari | G06F 16/278 707/694 |
| 2016/0350351 | A1* | 12/2016 | Barber | G06F 16/2365 |
| 2017/0147618 | A1* | 5/2017 | Geissinger | G06F 16/221 |
| 2018/0113622 | A1* | 4/2018 | Sancheti | G06F 11/2094 |
| 2018/0144014 | A1* | 5/2018 | Mittal | G06F 16/2322 |
| 2018/0253467 | A1* | 9/2018 | Gurajada | G06F 16/27 |
| 2019/0334952 | A1* | 10/2019 | Dhoble | H04L 63/20 |

FOREIGN PATENT DOCUMENTS

| | | |
|---|---|---|
| RU | 2647648 C1 | 3/2018 |
| WO | WO2016196286 A1 * | 12/2016 |

OTHER PUBLICATIONS

Randal, Paul, "The Accidental DBA (Day 27 of 30): Troubleshooting: Tempdb Contention", Retrieved from: https://www.sqlskills.com/blogs/paul/the-accidental-dba-day-27-of-30-troubleshooting-tempdb-contention/, Jun. 27, 2013, 15 Pages.

Alromema, et al., "Performance Evaluation of Attribute and Tuple Timestamping in Temporal Relational Database", in International Journal of Computer Science and Information Security, vol. 14, Sep. 30, 2016, 10 Pages.

"International Search Report and Written Opinion Issued in PCT Application No. PCT/US2019/031944", dated Aug. 7, 2019, 12 Pages.

* cited by examiner

PERSISTENT VERSION STORAGE FOR RELATIONAL DATABASE MANAGEMENT SYSTEM

CROSS-REFERENCE TO RELATED APPLICATIONS

This application is related to and claims the benefit of U.S. Provisional Patent Application Ser. No. 62/676,868, filed May 25, 2018, titled "Persistent Version Store for Relational Database System," which is expressly incorporated herein by reference in its entirety.

BACKGROUND

A relational database is a collection of data items organized as a set of formally described tables from which data can be accessed. The values within each table may be related to each other, and tables may also be related to other tables. The relational structure makes it possible to run queries across multiple tables at once. Relational databases are a common choice for the storage of various types of information, such as financial records, manufacturing and logistical information, personnel data, and the like.

A database management system (DBMS) controls the storage, retrieval, deletion, security, and integrity of data within a database. A relational database management system (RDBMS) is a DBMS that manages and facilitates access to a relational database. The most common use of RDBMSs is to provide the functions of creating, reading, updating, and deleting (CRUD). An RDBMS may facilitate access to a relational database by receiving queries from users, applications, or other entities, executing such queries against the relational database to produce a results dataset, and returning the results dataset to the entities that submitted the queries. The queries may be represented using Structured Query Language (SQL) or another suitable database query language.

The fundamental unit of storage in an RDBMS is typically referred to as a database page (or simply a page). The disk space allocated to a data file in a database is logically divided into database pages, which may be numbered contiguously from 0 to N. Disk input/output operations are typically performed at the database page level.

DETAILED DESCRIPTION

The present disclosure is generally related to a relational database management system (RDBMS) that implements persistent version storage, which is a mechanism for storing previous versions of data as active transactions modify data. Implementing persistent version storage may provide various advantages, such as instant (or near-instant) transaction rollback, accelerated database crash recovery, instant (or near-instant) logical reversion of entities in a database, time travel queries, better resource and security isolation, and better overall performance of the RDBMS.

Figure 1:
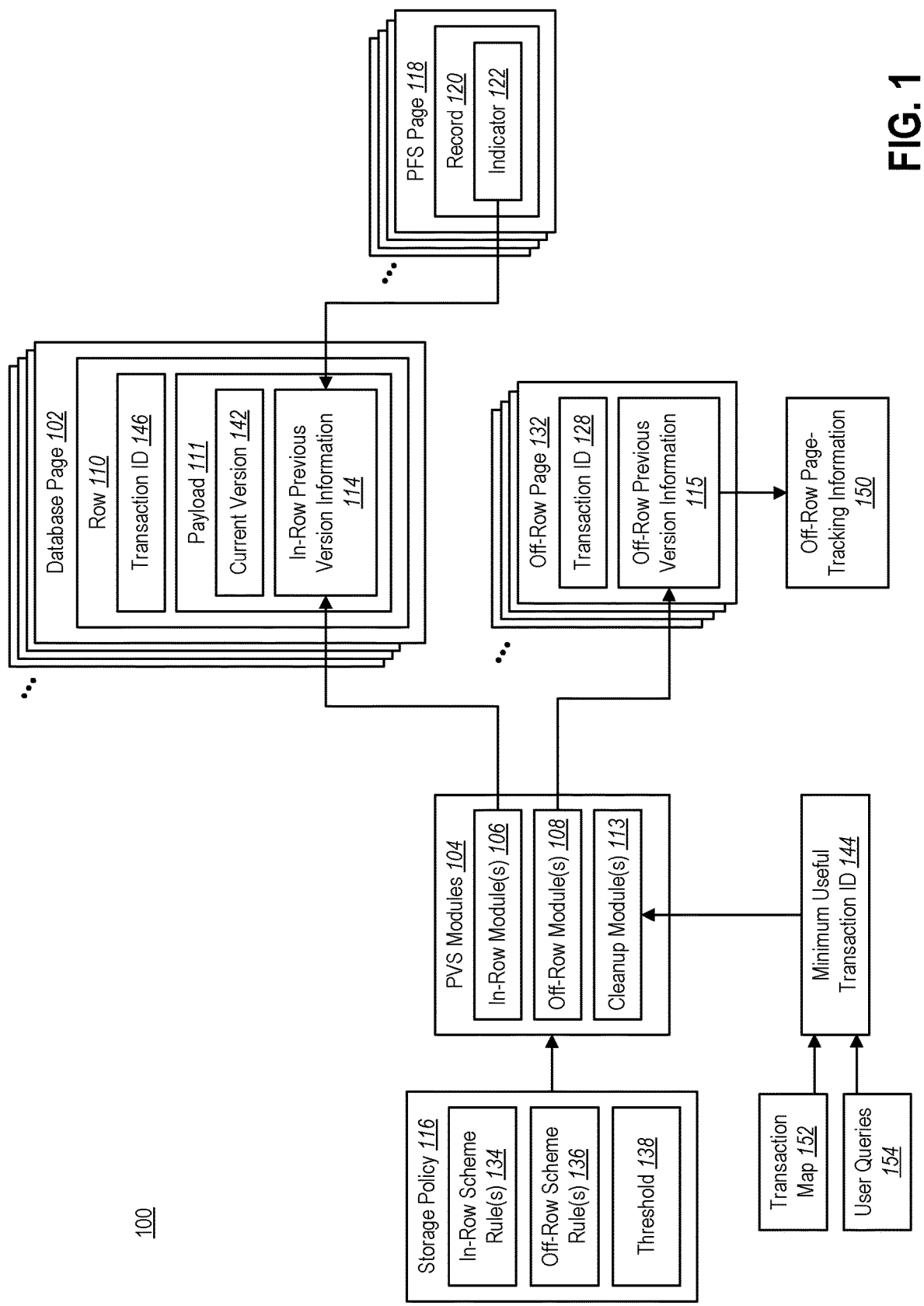
FIG. 1 illustrates an example of a relational database management system that implements persistent version storage in accordance with the present disclosure.

FIG. 1 illustrates an example of an RDBMS 100 that is configured to implement persistent version storage in accordance with the present disclosure. The RDBMS 100 stores data in database pages 102. Each database page 102 may include one or more rows 110. The RDBMS 100 includes modules 104 that perform various operations on the data within the database pages 102 to implement persistent version storage. These modules 104 may be referred to herein as persistent version storage (PVS) modules 104.

The PVS modules 104 may include one or more in-row modules 106 that are configured to implement an in-row scheme. In accordance with the in-row scheme, previous version information 114 about a particular row 110 within a database page 102 may be stored within the row 110 itself. Previous version information 114 that is stored within a row 110 may be referred to herein as in-row previous version information 114. The in-row previous version information 114 that is stored within a particular row 110 may be stored within a payload 111 of the row 110, along with the current version 142 of the row 110. Under some circumstances, the in-row previous version information 114 may include the difference between the current version 142 of the row 110 and the previous version of the row 110. Alternatively, the in-row previous version information 114 may include the entire previous version of the row 110.

The PVS modules 104 may also include one or more off-row modules 108 that are configured to implement an off-row scheme. In accordance with the off-row scheme, previous version information 115 about a particular row 110 within a database page 102 may be stored in a separate location (i.e., a location somewhere other than within the row 110 itself). Previous version information 115 that is stored somewhere other than within a row 110 may be referred to herein as off-row previous version information 115. The off-row previous version information 115 that is stored for a row 110 within a database page 102 may be stored in an off-row page 132 that is separate from the database page 102. The off-row previous version information 115 may include the entire previous version of the row 110. There may be multiple off-row pages 132 within the RDBMS 100. The off-row pages 132 may be similar to other database pages 102 in the RDBMS 100, except that the off-row pages 132 may be dedicated for off-row storage.

The RDBMS 100 may also include a storage policy 116 that defines when an in-row scheme is utilized and when an off-row scheme is utilized. In other words, the storage policy 116 may define when in-row previous version information 114 is stored in accordance with an in-row scheme and when off-row previous version information 115 is stored in accordance with an off-row scheme.

The storage policy 116 may include at least one rule 134 indicating when an in-row scheme is utilized and at least one rule 136 indicating when an off-row scheme is utilized. In some implementations, the in-row scheme rule(s) 134 may indicate that the in-row scheme should be utilized when the difference between the previous version of a row 110 and the current version 142 of the row 110 is less than a defined threshold 138. The off-row scheme rule(s) 136 may indicate that the off-row scheme should be utilized when the difference between the previous version of a row 110 and the current version 142 of the row 110 is greater than the threshold 138. The off-row scheme rule(s) 136 may also indicate that the off-row scheme should be utilized when additional metadata of the row needs to be stored that cannot be stored within the row 110 in accordance with the in-row scheme. There may be various reasons why such additional metadata cannot be stored within the row 110. These reasons may be defined by the storage policy 116.

The PVS modules 104 may also include one or more cleanup modules 113. Older versions of data may not be needed after some period of time. The cleanup module 113 may facilitate deletion of the previous version information (both in-row previous version information 114 and off-row previous version information 115) that is no longer needed by the RDBMS 100. In some implementations, the cleanup module 113 may take the form of one or more background processes within the RDBMS 100.

To facilitate cleanup of older versions of data that are no longer needed, different types of tracking may be implemented. For example, the RDBMS 100 may track where the in-row previous version information 114 is created. Since the in-row previous version information 114 is stored within particular rows 110, and the database can include a very large number (e.g., millions) of database pages 102, the RDBMS 100 may track which database pages 102 have older in-row previous version information 114 that may be cleaned up.

The database may include one or more special pages referred to as page free space (PFS) pages 118. PFS pages 118 may store metadata about database pages 102. In some implementations, every database page 102 that is managed by the RDBMS 100 may be tracked in a PFS page 118. For example, each database page 102 may have a record 120 that is associated with that database page 102 and that is included within a PFS page 118. A record 120 within a PFS page 118 that is associated with a particular database page 102 may include an indicator 122 that provides information about whether that database page 102 includes in-row previous version information 114. In some implementations, the indicator 122 may take the form of a single bit. Whenever a transaction produces new in-row previous version information 114 for a particular row 110 within a particular database page 102, the transaction may update the indicator 122 within the corresponding PFS page 118 to indicate that there is in-row previous version information 114 for that database page 102.

Another type of tracking may be related to what types of transactions are still interesting or useful to the RDBMS 100. Every version of a row 110 may be tagged or otherwise associated with a transaction identifier (ID) 146. Transaction IDs 146 may be monotonically increasing values. By considering which transactions and scans are considered active by the RDBMS 100, it may be possible to determine the minimum useful transaction identifier (ID) 144 that is still interesting or useful to the RDBMS 100. As long as the transaction ID 146 that is associated with a particular version of a row 110 exceeds the minimum useful transaction ID 144, then that version of the row 110 may be maintained by the RDBMS 100.

To facilitate cleanup, a cleanup module 113 may review the indicators 122 within the PFS pages 118 to identify what database pages 102 have in-row previous version information 114 associated with them. For each instance of in-row previous version information 114 that it finds, the cleanup module 113 may compare the transaction ID 146 that is associated with the in-row previous version information 114 with the minimum useful transaction ID 144 in order to determine whether the in-row previous version information 114 is still of interest to the RDBMS 100. If the transaction ID 146 of the in-row previous version information 114 is less than the minimum useful transaction ID 144 (which indicates that the in-row previous version information 114 is not of interest to the RDBMS 100 and is therefore no longer needed), then the cleanup module 113 may delete the in-row previous version information 114, thereby reclaiming the space on the database page 102 that was occupied by the in-row previous version information 114. In addition to the cleanup module 113, updates (e.g., transaction updates) to a database page 102 may also contribute to the cleanup of in-row previous version information 114.

Cleanup of off-row previous version information 115 will now be discussed. The off-row pages 132 may store older versions from different objects (e.g., different tables) that are managed by the RDBMS 100. Consequently, a single off-row page 132 may store off-row previous version information 115 corresponding to different rows 110 from different database pages 102.

When a database transaction causes off-row previous version information 115 to be pushed to an off-row page 132, the transaction may contribute its transaction ID 148 to the off-row page 132. The RDBMS 100 may maintain off-row page tracking information 150 to track the off-row pages 132. In some implementations, the off-row page tracking information 150 may take the form of a hash map. The off-row page tracking information 150 may indicate the maximum transaction identifier (ID) that is associated with each off-row page 132.

For each off-row page 132, the cleanup module 113 may compare the maximum transaction ID for the off-row page 132 with the minimum useful transaction ID 144. When the maximum transaction ID associated with a particular off-row page 132 is less than the minimum useful transaction ID 144 (meaning that the off-row previous version information 115 stored on that off-row page 132 is no longer of interest to the RDBMS 100), that off-row page 132 can be reclaimed. In other words, the off-row previous version information 115 that is stored on that off-row page 132 can be deleted.

The cleanup of in-row previous version information 114 and off-row previous version information 115 may be different in some respects. For example, whereas specific instances of in-row previous version information 114 may be cleaned up, this may not be the case for off-row previous version information 115. Instead, entire off-row pages 132 containing off-row previous version information 115 may be cleaned up. In other words, off-row previous version information 115 may be cleaned up at a page-level granularity, which may be beneficial both in terms of faster cleanup and reducing the amounts of log entries needed for cleanup.

There are a variety of factors that may contribute to determining the minimum useful transaction ID 144. There may be various components that are each associated with some minimum useful transaction ID. For example, whenever a transaction is started (e.g., by a user or by the RDBMS 100 itself), the transaction may be tracked in a transaction map 152. Every transaction may have a transaction ID, which may be a monotonically increasing number. Thus, each new transaction may be associated with a new, higher transaction ID. The minimum of all of the transaction IDs in the transaction map 152 is one component that may be used to determine the overall minimum useful transaction ID 144.

As an example of another component, the RDBMS 100 may have user queries 154 may be reading data. The RDBMS 100 may include dependency tracking mechanisms that determine what the minimum useful transaction ID 144 is for these user queries 154. In some implementations, there may be user queries 154 that are scanning the data not just on the local database but also on one or more remote database replicas. Dependency tracking mechanisms may be provided for these remote scanners as well. The minimum useful transaction ID 144 may be determined by taking the minimum of all of the various components.

Figure 2A:
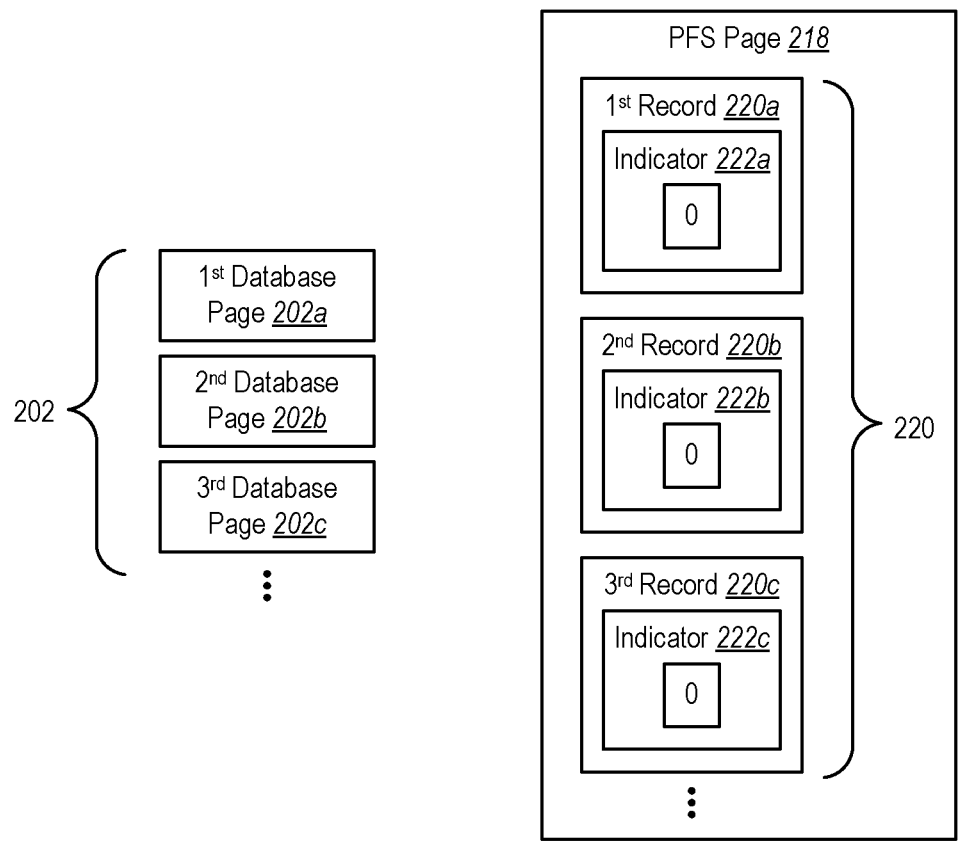
FIGS. 2A and 2B illustrate an example showing how a page free space (PFS) page may be utilized to facilitate tracking of in-row previous version information.
Figure 2B:
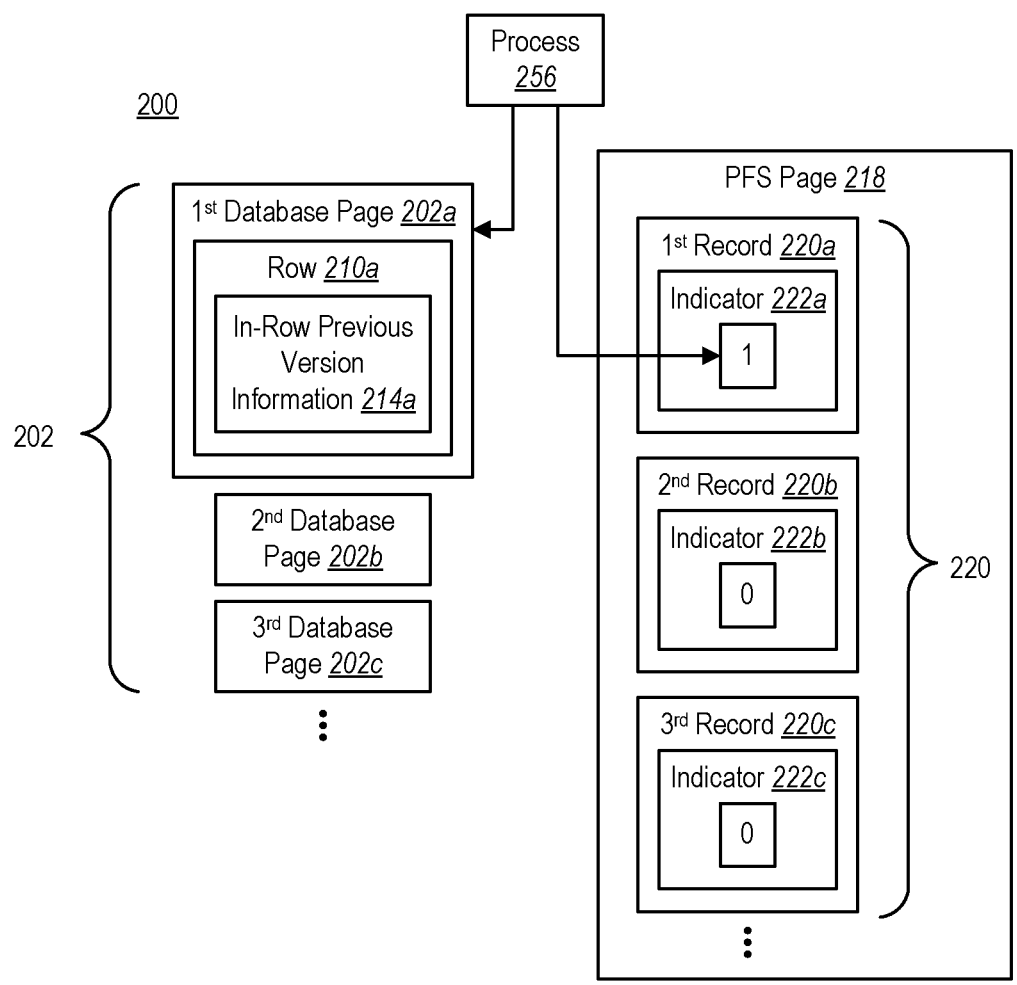

FIGS. 2A and 2B illustrate an example showing how a PFS page 218 may be utilized to facilitate tracking of in-row previous version information. Reference is initially made to FIG. 2A. An RDBMS 200 may manage a plurality of database pages 202, including a first database page 202a, a second database page 202b, and a third database page 202c. The RDBMS 200 may also manage at least one PFS page 218. The PFS page 218 may include a plurality of records 220, each record 220 corresponding to a particular database page 202. For example, the PFS page 218 may include a first record 220a corresponding to the first database page 202a, a second record 220b corresponding to the second database page 202b, and a third record 220c corresponding to the third database page 202c.

In the depicted example, the first record 220a includes an indicator 222a that provides information about whether the first database page 202a includes any in-row previous version information. The indicator 222b in the second record 220b and the indicator 222c in the third record 220c provide similar information about the second database page 202b and the third database page 202c, respectively. In some implementations, the indicators 222a-c may each be single bits. The RDBMS 200 may be configured such that when an indicator is set to a first value (e.g., "0"), this indicates that the corresponding database page 202 does not include in-row previous version information. Conversely, when an indicator is set to a second value (e.g., "1"), this indicates that the corresponding database page 202 includes in-row previous version information. In FIG. 2A, the indicators 222a-c are each shown as having a value of "0". For purposes of the present example, it will be assumed that this means that none of the corresponding database pages 202a-c include any in-row previous version information.

Reference is now made to FIG. 2B. Suppose that a process 256 performs a transaction on the first database page 202a, and that the transaction causes a row 210a within the first database page 202a to be updated to include in-row previous version information 214a. To facilitate subsequent cleanup of the in-row previous version information 214a, the process 256 that performs the transaction may also update the indicator 222a in the first record 220a (which corresponds to the first database page 202a) to reflect the fact that the first database page 202a includes in-row previous version information 214a.

Figure 3:
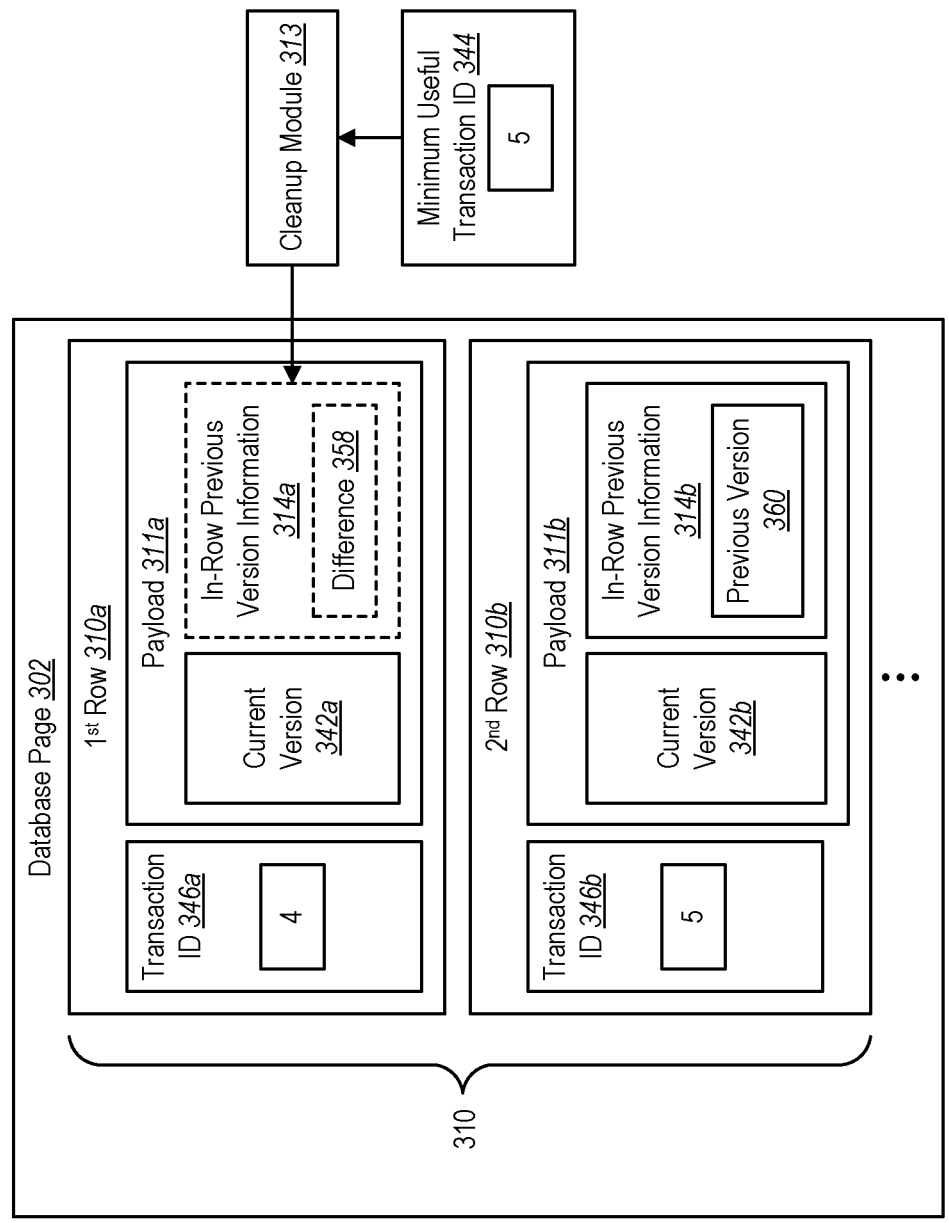
FIG. 3 illustrates an example showing different types of in-row previous version information that may be stored and also how in-row previous version information may be cleaned up.

FIG. 3 illustrates an example showing different types of in-row previous version information that may be stored. A database page 302 may include a plurality of rows 310, including a first row 310a and a second row 310b. In the depicted example, both of the rows 310a-b include in-row previous version information 314a-b stored within the respective payloads 311a-b, along with the current versions 342a-b of the rows 310a-b. However, the in-row previous version information 314a that is stored within the first row 310a is the difference 358 between the current version 342a of the first row 310a and the previous version of the first row 310a. In contrast, the in-row previous version information 314b that is stored within the second row 310b is the entire previous version 360 of the second row 310b.

The example shown in FIG. 3 also illustrates how in-row previous version information may be cleaned up. As indicated above, every version of a row 310 may be tagged or otherwise associated with a transaction ID. In the depicted example, the first row 310a is associated with a transaction ID 346a having a value of "4," and the second row 310b is associated with a transaction ID 346b having a value of "5." A cleanup module 313 may use the transaction IDs 346a-b to identify particular instances of in-row previous version information that may be cleaned up.

More specifically, the cleanup module 313 may determine (by referring to one or more PFS pages 118, for example) that the first row 310a and the second row 310b include in-row previous version information 314a-b. To determine whether the in-row previous version information 314a in the first row 310a may be cleaned up, the cleanup module 313 may compare the transaction ID 346a that is associated with the first row 310a with a minimum useful transaction ID 344 that is associated with the entire RDBMS 300. If the transaction ID 346a associated with the first row 310a is greater than or equal to the minimum useful transaction ID 344, this means that the previous version information 314a is still useful to the RDBMS 300 and should not be cleaned up. If, however, the transaction ID 346a associated with the first row 310a is less than the minimum useful transaction ID 344, this means that the previous version information 314a is no longer useful to the RDBMS 300 and may be cleaned up.

In the depicted example, it will be assumed that the minimum useful transaction ID 344 for the entire RDBMS 300 is "5." Because the transaction ID 346a associated with the first row 310a has a value of "4" and is therefore less than the minimum useful transaction ID 344 for the RDBMS 300, the cleanup module 313 may delete the in-row previous version information 314a that is associated with the first row 310a. To indicate this, the in-row previous version information 314a associated with the first row 310a is shown in dotted lines in FIG. 3.

On the other hand, the transaction ID 346b associated with the second row 310b has a value of "5," which is equal to the minimum useful transaction ID 344. Therefore, in this example the in-row previous version information 314b associated with the second row 310b is not eligible for cleanup.

Of course, the specific values (e.g., values of transaction IDs 346a-b) that are shown in this and other examples described herein should not be interpreted as limiting the scope of the present disclosure. Transaction IDs and other parameters may be assigned in a variety of different ways in accordance with the present disclosure.

Figure 4:
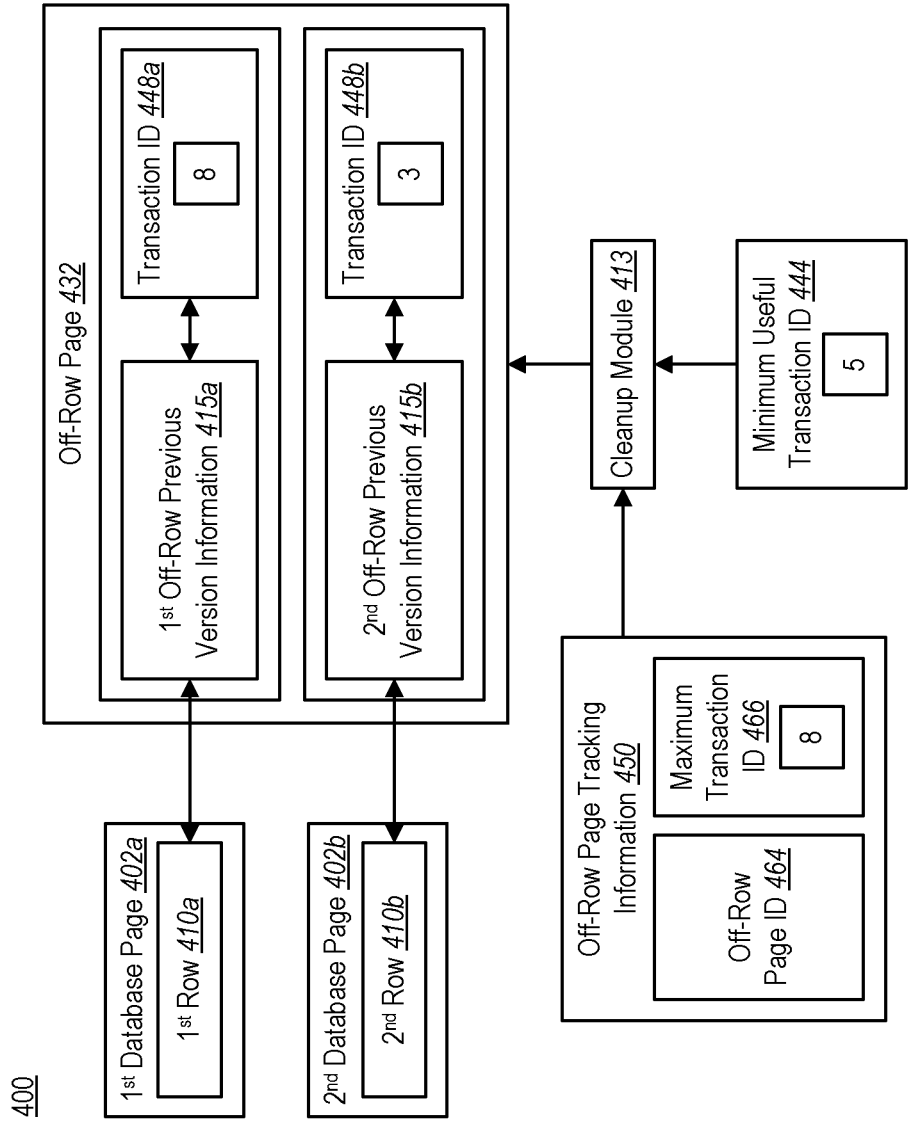
FIG. 4 illustrates an example showing how off-row previous version information may be cleaned up.

FIG. 4 illustrates an example showing how off-row previous version information may be cleaned up. An off-row page 432 may include a plurality of different instances of off-row previous version information 415a-b, which may be associated with different rows 410a-b and may correspond to different database pages 402a-b. In the depicted example, the off-row page 432 includes a first instance of off-row previous version information 415a corresponding to a first row 410a in a first database page 402a. The off-row page 432 also includes a second instance of off-row previous version information 415b corresponding to a second row 410b in a second database page 402b.

As indicated above, when a database transaction causes off-row previous version information to be pushed to an off-row page 432, the transaction may contribute its transaction ID to the off-row page 432. In other words, the transaction ID that is associated with the transaction may also be associated with the off-row version information. Thus, each instance of off-row previous version information that is stored in the off-row page 432 may be associated with a different transaction identifier (ID). In the depicted example, the first off-row previous version information 415a is associated with a transaction ID 448a having a value of "8," and the second off-row previous version information 415b is associated with a transaction ID 448b having a value of "3."

The RDBMS 400 may utilize off-row page tracking information 450, which may indicate the maximum transaction ID that is associated with each off-row page that is managed by the RDBMS 400. For example, with respect to the off-row page 432 that is shown in FIG. 4, the off-row page tracking information 450 may include an identifier 464 that is associated with the off-row page 432. This identifier 464 may be associated with the maximum transaction ID 466 that is included within the off-row page 432 (which is "8" in this example).

As indicated above, off-row previous version information may be cleaned up at a page-level granularity. In other words, a cleanup module 413 may be configured so that it either deletes all of the off-row previous version information 415a-b stored in a particular off-row page 432 (instead of deleting individual instances of the off-row previous version information 415a-b), or it does not delete any of the off-row previous version information 415a-b stored in the off-row page 432. When a cleanup module 413 deletes all of the off-row previous version information 415a-b stored in an off-row page 432, this may be referred to as deallocating the off-row page 432. To determine whether a particular off-row page 432 should be deallocated, a cleanup module 413 may refer to the off-row page tracking information 450 to determine the maximum transaction ID 466 that is associated with the off-row page 432. The maximum transaction ID 466 for the off-row page 432 may be compared with the minimum useful transaction ID 444 for the entire RDBMS 400. If the maximum transaction ID 466 for the off-row page 432 is greater than or equal to the minimum useful transaction ID 444, this means that the off-row page 432 includes at least some off-row previous version information 415a-b that is still useful to the RDBMS 400 and should not be cleaned up. If, however, the maximum transaction ID 466 for the off-row page 432 is less than the minimum useful transaction ID 444, this means that none of the off-row previous version information 415a-b stored in the off-row page 432 is still useful to the RDBMS 400, and as a result the off-row page 432 may be deallocated. In the depicted example, because the maximum transaction ID 466 for the off-row page 432 ("8") is greater than the minimum useful transaction ID 444 for the RDBMS 400 ("5"), the cleanup module 413 may determine that the off-row page 432 should not be deallocated.

FIGS. 5A-G illustrate an example showing how persistent version storage may be implemented in accordance with the present disclosure. The example involves a database page 502. To facilitate the implementation of persistent version storage, an off-row page 532 and off-row page tracking information 550 may be utilized.

Figure 5A:
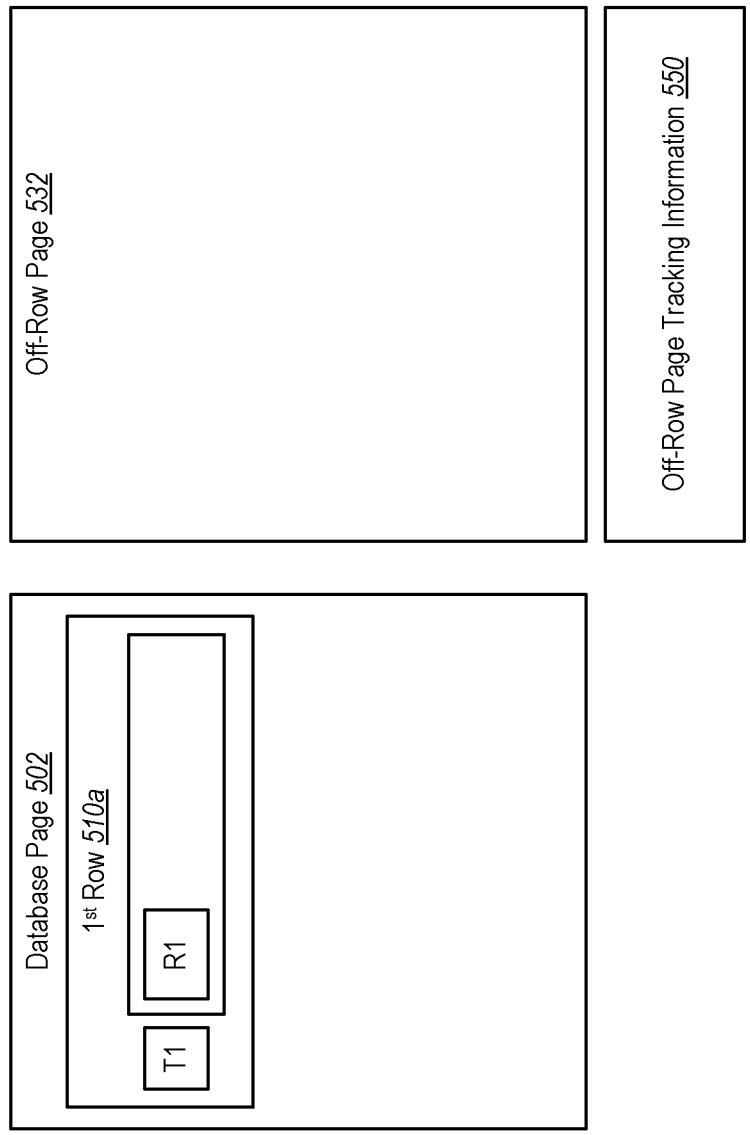
FIGS. 5A-G illustrate an example showing how persistent version storage may be implemented in accordance with the present disclosure.

Reference is initially made to FIG. 5A. Suppose that transaction T1 inserts a first row 510a into the database page 502 and then commits. The current version of the first row 510a at this point in time may be designated as R1. Next, suppose that transaction T2 (not shown) starts a snapshot scan and queries all rows within the system.

Figure 5B:
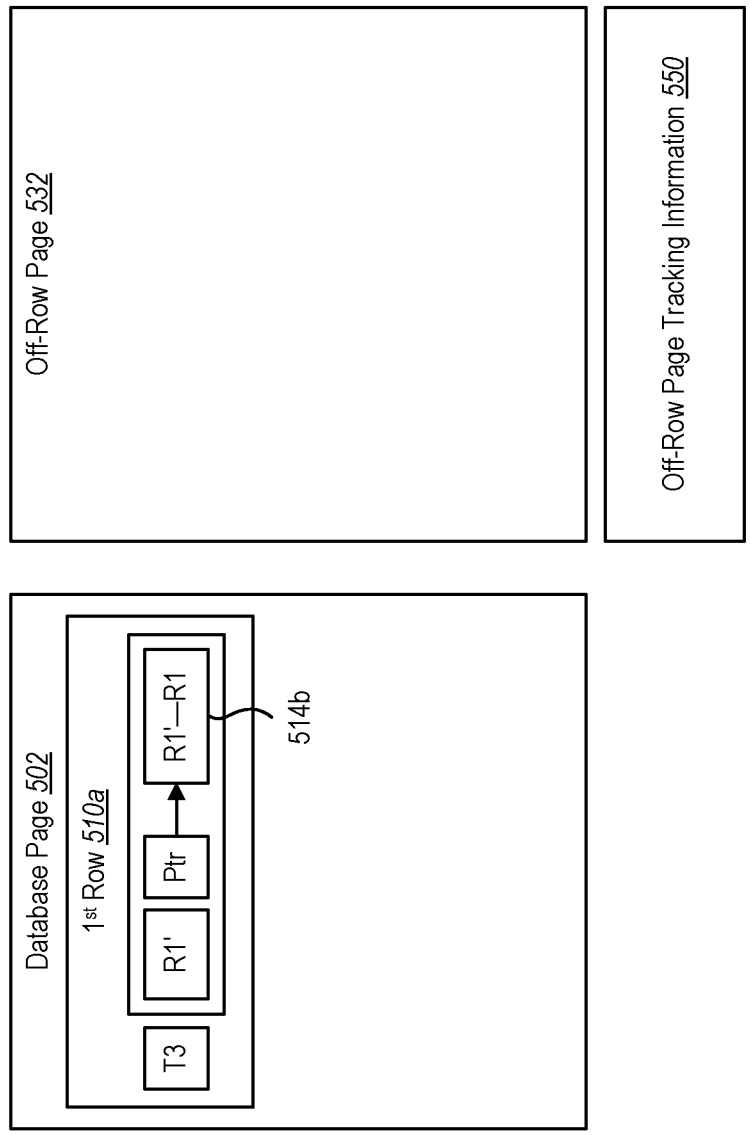

Reference is now made to FIG. 5B. While transaction T2 is still active, suppose that transaction T3 updates the first row 510a and commits. The current version of the first row 510a at this point in time may be designated as R1'. In-row previous version information 514b may be stored within the payload of the first row 510a. The in-row previous version information 514b may be the difference between the current version of the first row 510a and the previous version of the first row 510a (i.e., R1'–R1).

Figure 5C:
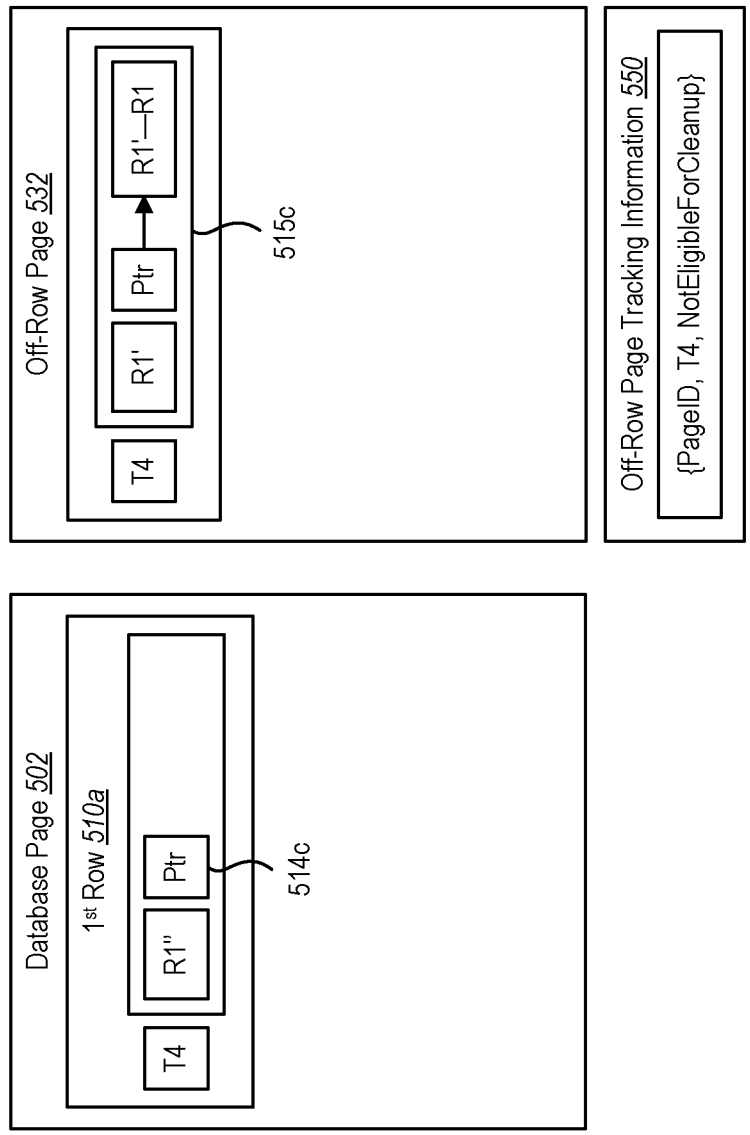

Reference is now made to FIG. 5C. Suppose that transaction T4 updates the first row 510a such that the current version of the first row 510a at this point in time may be designated as R1". Further suppose that transaction T4 commits. In response to this update, based on a storage policy that has been defined for the system, off-row previous version information 515c may be stored in the off-row page 532. The off-row previous version information 515c may be associated with the transaction ID T4 and may include the previous contents of the first row 510a. The first row 510a still includes in-row previous version information 514c, in the form of a pointer to the off-row previous version information 515c.

The off-row page tracking information 550 indicates that the off-row page 532 is not eligible for cleanup. This may be because the off-row page 532 still has space to store additional off-row previous version information.

Next, suppose that transaction T2 queries all rows within the system again, and then commits (or rolls back). Further suppose that transaction T6 starts, and that T6 is the minimum useful transaction ID for the system. A version cleaner (e.g., a cleanup module) may wake up at this point. The version cleaner may perform a scan of all PFS pages in the system, and as a result it may determine that the database page 502 includes in-row previous version information 514c (in the form of a pointer to the off-row previous version information 515c).

Figure 5D:
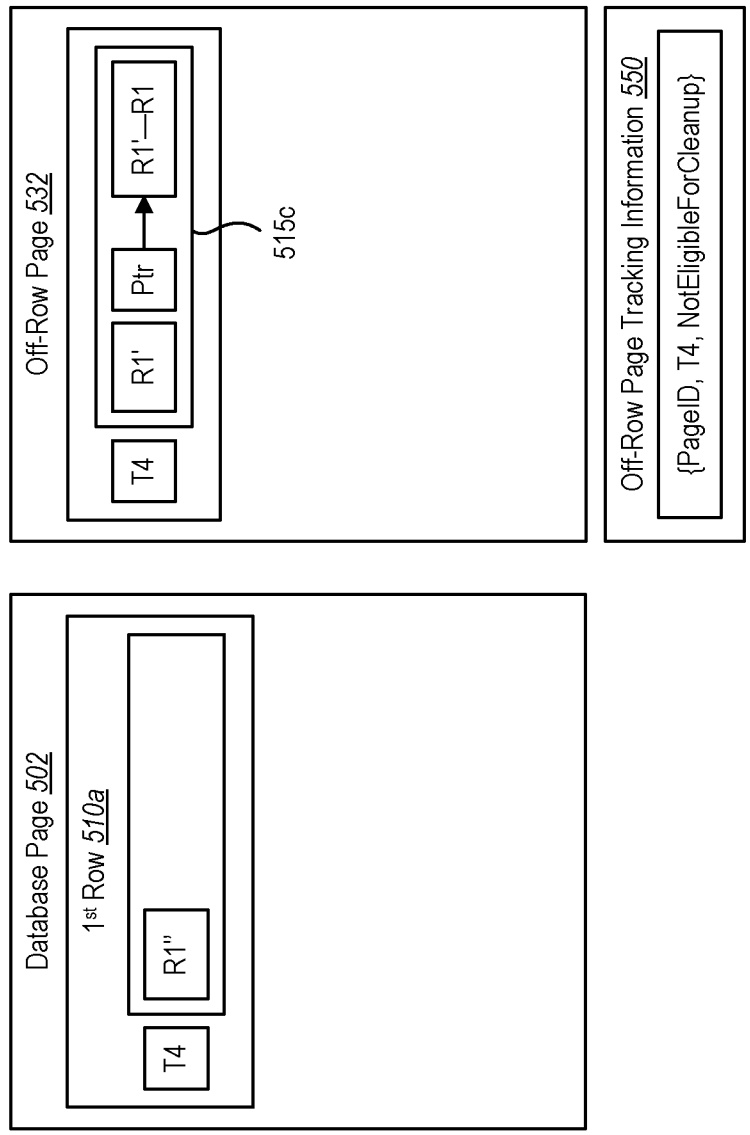
Figure 5E:
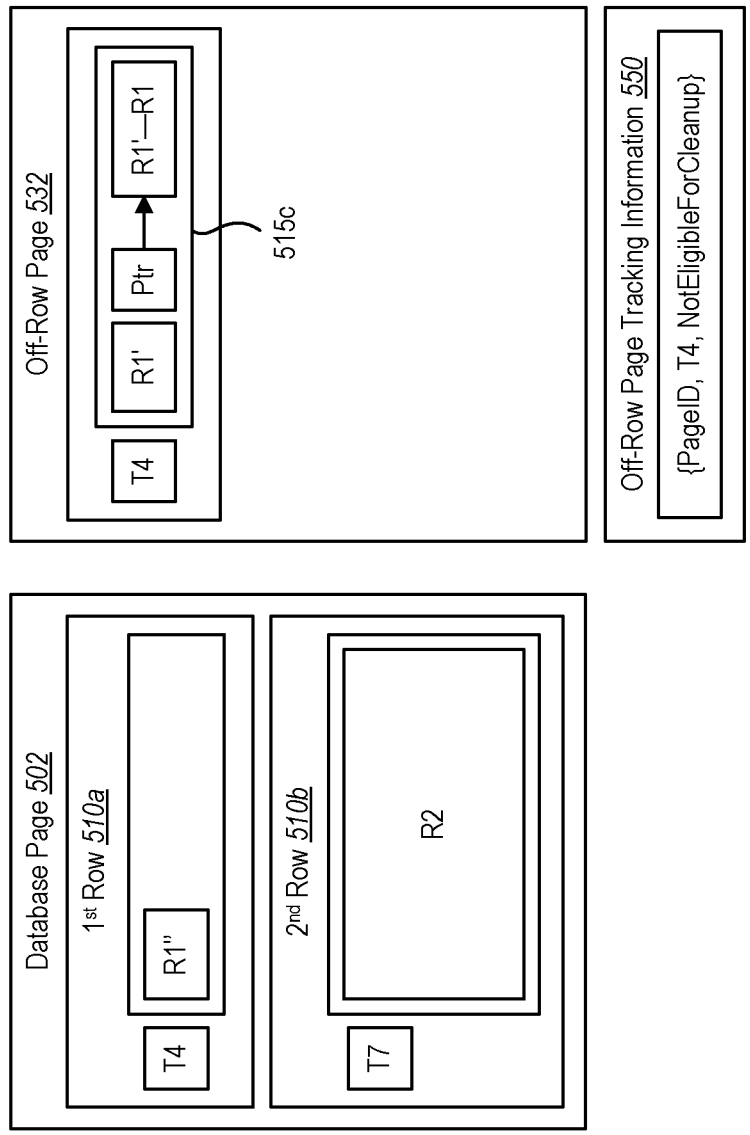

Reference is now made to FIG. 5D. Because the first row 510a is associated with transaction T4 (since transaction T4 updated the first row 510a to R1"), and because transaction T4 is less than the minimum useful transaction ID for the system (which is T6), the version cleaner deletes the in-row previous version information 514c (the pointer) from the first row 510a. However, the version cleaner may choose not to deallocate the off-row page 532 because the off-row page 532 still has space to store additional off-row previous version information.

Next, suppose that transaction T6 commits. Then, referring to FIG. 5E, suppose that transaction T7 inserts a second row 510b into the database page 502 and commits. The current version of the second row 510b at this point in time may be designated as R2.

Figure 5F:
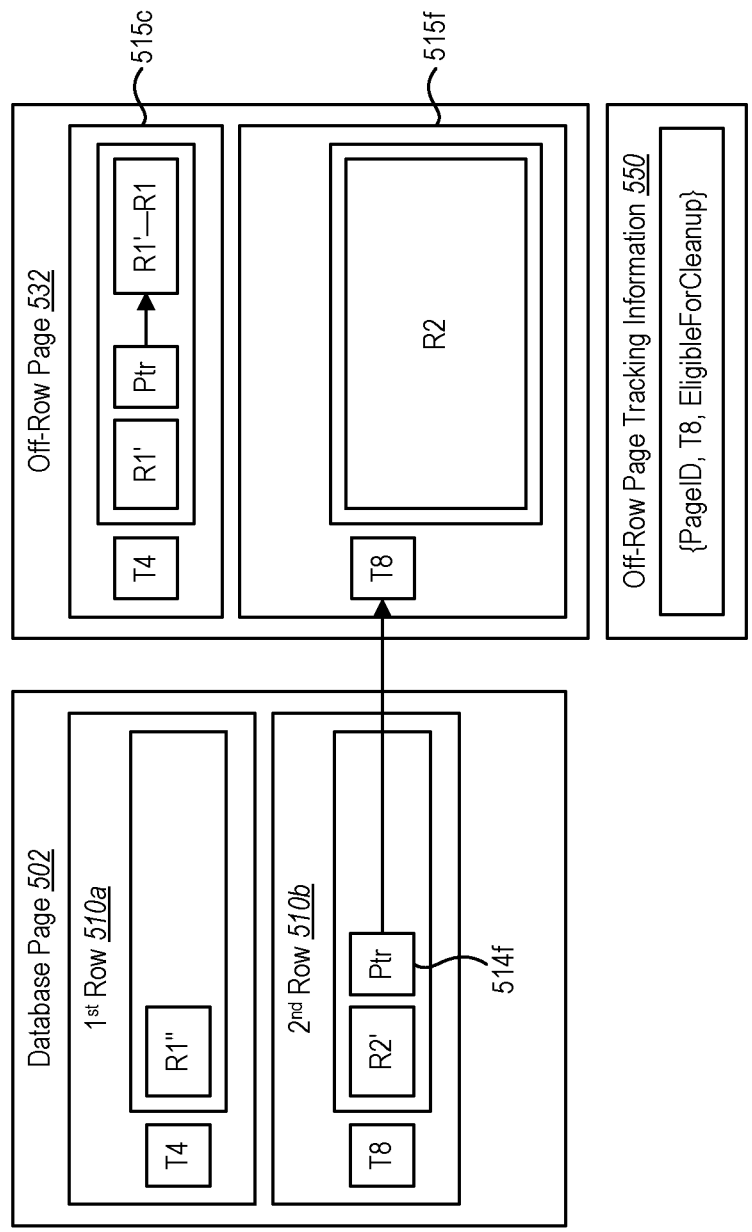

Reference is now made to FIG. 5F. Suppose that transaction T8 updates R2 to R2', and R2 is pushed to the off-row page 532 as off-row previous version information 515f. The second row 510b includes in-row previous version information 514f in the form of a pointer to the off-row previous version information 515f. Further suppose that, due to the size of R2, the off-row page 532 is determined to be full with the addition of R2, such that the off-row page tracking information 550 indicates that the off-row page 532 is eligible for cleanup. Transaction T8 then commits.

Figure 5G:
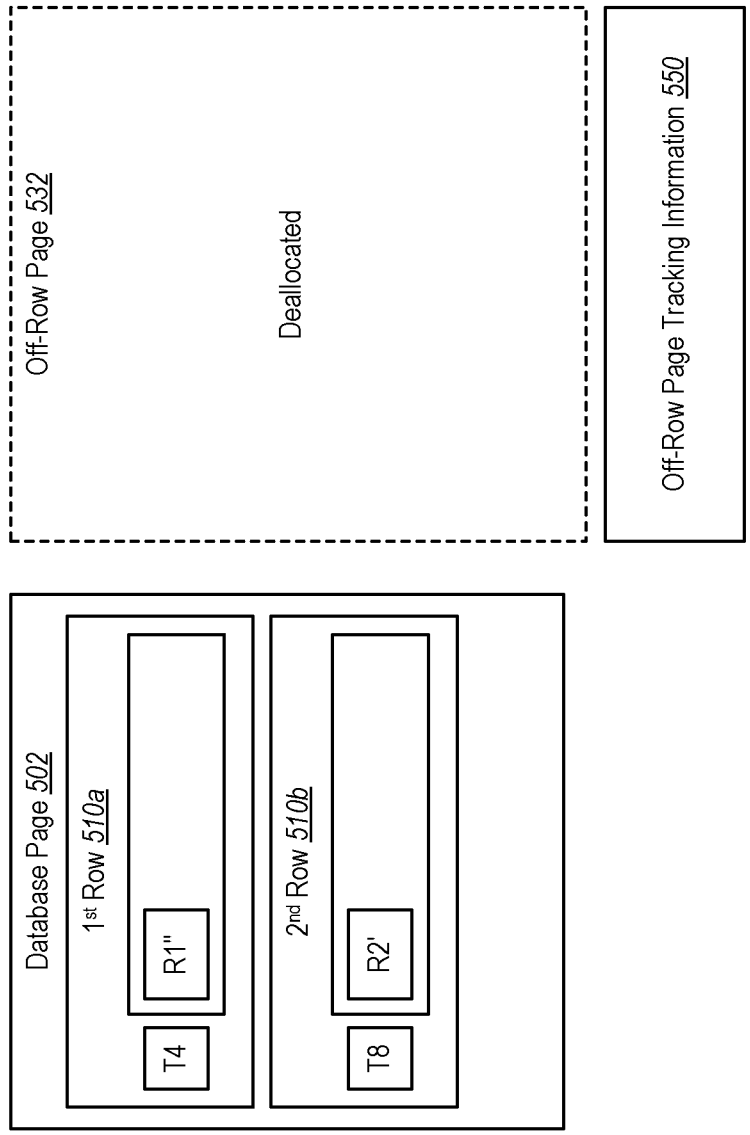

Reference is now made to FIG. 5G. The background thread version cleaner wakes up and cleans the stale versions on the database page 502. More specifically, it deletes the in-row previous version information 514*f* (the pointer) in the second row 510*b* because the transaction ID associated with the second row 510*b* is less than the minimum useful transaction ID for the system (T9). The version cleaner also deallocates the off-row page 532 because the off-row page tracking information 550 indicates that the off-row page 532 is eligible for cleanup.

Figure 6:
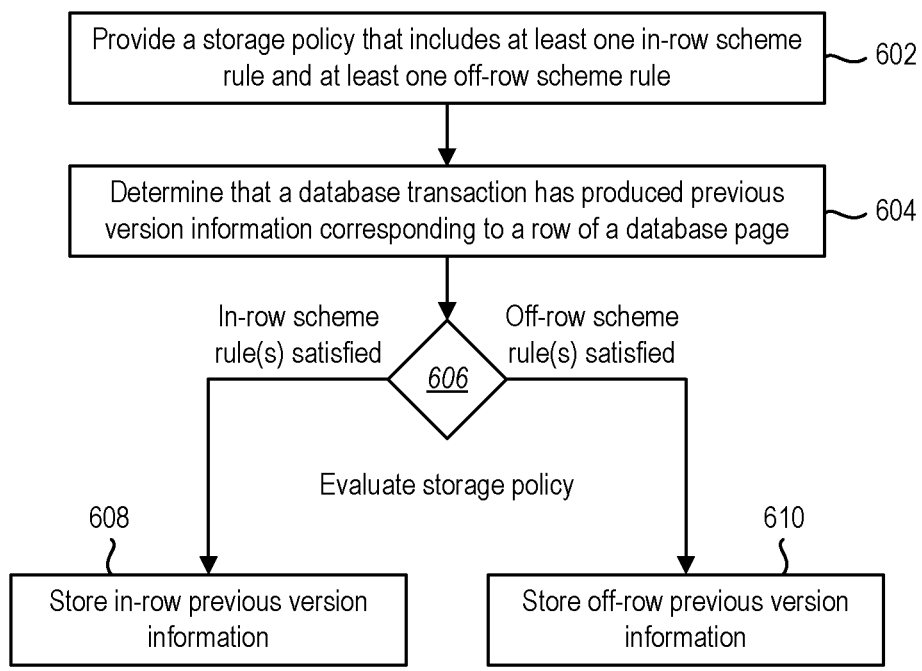
FIG. 6 illustrates an example of a method for implementing persistent version storage in accordance with the present disclosure.

FIG. 6 illustrates an example of a method 600 for implementing persistent version storage in accordance with the present disclosure. The method 600 includes providing 602 a storage policy 116. The storage policy 116 may include at least one rule 134 that defines when an in-row scheme is utilized to store in-row previous version information 114. The storage policy 116 may also include at least one rule 136 that defines when an off-row scheme is utilized to store off-row previous version information 115. As indicated above, the in-row scheme rule(s) 134 may indicate that the in-row scheme should be utilized when the difference between the previous version of a row 110 and the current version 142 of the row 110 is less than a defined threshold 138. The off-row scheme rule(s) 136 may indicate that the off-row scheme should be utilized when the difference between the previous version of a row 110 and the current version 142 of the row 110 is greater than the threshold 138.

When it is determined 604 that a database transaction has produced previous version information corresponding to a row 110 of a database page 102, the method 600 may include evaluating 606 the in-row scheme rule(s) 134 and the off-row scheme rule(s) 136 to determine whether the previous version information should be stored as in-row previous version information 114 or off-row previous version information 115. If at least one in-row scheme rule 134 is satisfied, the method 600 may include storing 608 the previous version information as in-row previous version information 114 within a payload 111 of the row 110 of the database page 102. In contrast, if at least one off-row scheme rule 136 is satisfied, the method 600 may include storing 610 the previous version information as off-row previous version information 115 in a separate location, such as an off-row page 132.

Persistent version storage, as described herein, may facilitate additional capabilities in a database system. For example, persistent version storage may facilitate instant transaction rollback and accelerated database crash recovery. Instead of walking the transaction log to rollback a transaction and restore original data in the database pages, persisted versions may be used to rollback transactions instantly by simply marking the current version as invalid, and using a lazy revert process to lazily move previously committed data from version store to database page. This also allows database crash recovery durations to be independent of the durations of long-running customer transactions since it removes the need to replay transaction logs from the point of the oldest active transaction.

As another example, persistent version storage may facilitate instant logical reversion of entities in the database. By allowing users to persist previous versions of data for a long time, logical objects such as rows, tables, and indexes can be instantly reverted to a previous version. This may be a beneficial alternative for users who have accidentally performed a wrong operation on their data and want to undo it. In current implementations it may be necessary to take a lengthy down time as they restore their database from backups through point-in-time restore.

As another example, persistent version storage may facilitate time travel queries. Persisted versions of data may be used to allow customers to query their tables as of a particular point in time, or query the historical values of rows to perform trend analysis.

As another example, persistent version storage may facilitate better resource and security isolation. In currently known implementations, the module(s) that provide version storage may be shared by all databases in a particular instance of the system. With persistent version storage functionality, each database may have its own version store. This may provide benefits for resource boundary and security isolation.

As another example, persistent version storage may facilitate better performance. As discussed above, persistent version storage may include two storage parts, an in-row part and off-row part. The in-row part may be located at the same data page. It may not require additional input/output for version access. In-row version applies to delete operations and row updates with certain limited size, such as the size of the difference between the current version of the row and the previous version of the row. If the size difference in the update is greater than the limit of in-row storage, it may be stored in the off-row version store. Some special usage of versioning may also push the version to the off-row store.

Figure 7:
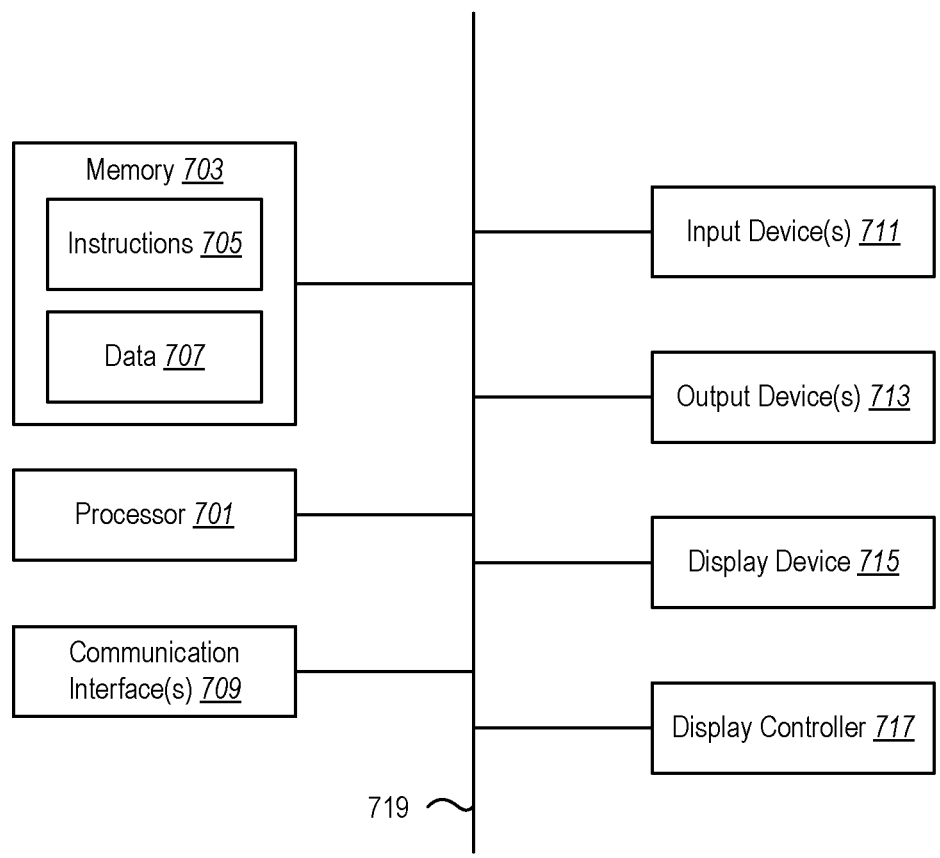
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 8 as a bus system 719.

In accordance with an aspect of the present disclosure, a relational database system that implements persistent version storage is disclosed. The relational database system may include one or more processors and memory in electronic communication with the one or more processors. The relational database system may also include an in-row module, an off-row module, and a storage policy stored in the memory. The in-row module may be executable by the one or more processors to implement an in-row scheme by storing in-row previous version information within a payload of a row within a database page. The off-row module may be executable by the one or more processors to implement an off-row scheme by storing off-row previous version information in an off-row page that is separate from the database page. The storage policy may define when previous version information is stored in accordance with the in-row scheme and when the previous version information is stored in accordance with the off-row scheme.

In some implementations, the in-row previous version information may include a difference between a current version of the row and a previous version of the row. As another example, the in-row previous version information may include a previous version of the row.

The storage policy may include at least one in-row scheme rule indicating that the in-row scheme is utilized when a difference between a previous version of the row and a current version of the row is less than a defined threshold. The storage policy may additionally include at least one off-row scheme rule indicating that the off-row scheme is utilized when the difference between the previous version of the row and the current version of the row is greater than the defined threshold, or when additional metadata of the row needs to be stored that cannot be stored in the row.

A cleanup module may be stored in the memory. The cleanup module may be executable by the one or more processors to delete the previous version information that is no longer needed. In some implementations, the cleanup module may be additionally executable by the one or more processors to determine a minimum useful transaction identifier for the relational database system, compare a transaction identifier associated with the row with the minimum useful transaction identifier, and delete the in-row previous version information if the transaction identifier is less than the minimum useful transaction identifier.

The relational database system may further include an off-row page stored in the memory. The off-row page may store a plurality of different instances of the off-row previous version information. The plurality of different instances of the off-row previous version information may correspond to different rows. Each instance of the off-row previous version information may be associated with a different transaction identifier. The cleanup module may be executable by the one or more processors to determine a minimum useful transaction identifier for the relational database system, determine a maximum transaction identifier for the off-row page, compare the minimum useful transaction identifier for the relational database system with the maximum transaction identifier for the off-row page, and deallocate the off-row page if the maximum transaction identifier for the off-row page is less than the minimum useful transaction identifier for the relational database system.

The relational database system may further include a plurality of database pages stored in the memory, at least one page free space (PFS) page stored in the memory, and instructions stored in the memory. The at least one PFS page may include a record for each of the plurality of database pages. The record associated with a database page may indicate whether the database page is associated with any in-row previous version information. The instructions may be executable by the one or more processors to update the indicator corresponding to the database page when a database transaction produces new in-row previous version information for the database page.

In accordance with another aspect of the present disclosure, a method for implementing persistent version storage is disclosed. The method may include providing a storage policy. The storage policy may include at least one in-row scheme rule that defines when an in-row scheme is utilized to store in-row previous version information. The storage policy may further include at least one off-row scheme rule that defines when an off-row scheme is utilized to store off-row previous version information. The method may further include storing the in-row previous version information within a payload of a row of a database page in accordance with the in-row scheme when an in-row scheme rule is satisfied, and storing the off-row previous version information in a separate off-row page in accordance with the off-row scheme when an off-row scheme rule is satisfied. The method may further include deleting previous version information that is no longer needed.

The in-row previous version information may include at least one of a difference between a current version of the row and a previous version of the row, or the previous version of the row.

The at least one in-row scheme rule may indicate that the in-row scheme is utilized when a difference between a previous version of the row and a current version of the row is less than a defined threshold. The at least one off-row scheme rule may indicate that the off-row scheme is utilized when the difference between the previous version of the row and the current version of the row is greater than the defined threshold, or when additional metadata of the row needs to be stored that cannot be stored in the row.

The method may further include determining a minimum useful transaction identifier, comparing a transaction identifier associated with the row with the minimum useful transaction identifier, and deleting the in-row previous version information if the transaction identifier is less than the minimum useful transaction identifier.

The method may further include determining a minimum useful transaction identifier, determining a maximum transaction identifier for the off-row page, comparing the minimum useful transaction identifier with the maximum transaction identifier for the off-row page, and deallocating the off-row page if the maximum transaction identifier for the off-row page is less than the minimum useful transaction identifier.

In accordance with another aspect of the present disclosure, a relational database system that implements persistent version storage is disclosed. The relational database system may include one or more processors and memory in electronic communication with the one or more processors. The relational database system may also include a plurality of database pages and a storage policy stored in the memory. The storage policy may include at least one in-row scheme rule that defines when an in-row scheme is utilized to store in-row previous version information. The storage policy may further include at least one off-row scheme rule that defines when an off-row scheme is utilized to store off-row previous version information. Instructions may also be stored in the memory. The instructions may be executable by the one or more processors to store the in-row previous version information within a payload of a row of a database page in accordance with the in-row scheme when an in-row scheme rule is satisfied, and store the off-row previous version information in a separate off-row page in accordance with the off-row scheme when the an off-row scheme rule is satisfied. The instructions may be additionally executable by the one or more processors to delete previous version information that is no longer needed.

The in-row previous version information may include at least one of a difference between a current version of the row and a previous version of the row, or the previous version of the row.

The at least one in-row scheme rule may indicate that the in-row scheme is utilized when a difference between a previous version of the row and a current version of the row is less than a defined threshold. The at least one off-row scheme rule may indicate that the off-row scheme is utilized when the difference between the previous version of the row and the current version of the row is greater than the defined threshold, or when additional metadata of the row needs to be stored that cannot be stored in the row.

The instructions may be additionally executable by the one or more processors to determine a minimum useful transaction identifier, compare a transaction identifier associated with the row with the minimum useful transaction identifier, and delete the in-row previous version information if the transaction identifier is less than the minimum useful transaction identifier.

The instructions may be additionally executable by the one or more processors to determine a minimum useful transaction identifier, determine a maximum transaction identifier for the off-row page, compare the minimum useful transaction identifier with the maximum transaction identifier for the off-row page, and deallocate the off-row page if the maximum transaction identifier for the off-row page is less than the minimum useful transaction identifier.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A relational database system that implements persistent version storage, comprising:
   one or more processors;
   memory in electronic communication with the one or more processors;
   a first database page comprising a first row and a second row, wherein the first row comprises a first payload and the first payload comprises a current version of the first row;
   an off-row page separate from the first database page;
   instructions that are executable by the one or more processors to:
      store information regarding a previous version of the first row within the first payload of the first row within the first database page when the relational database system utilizes an in-row scheme; and
      store the information regarding the previous version of the first row in the off-row page when the relational database system utilizes an off-row scheme, wherein the off-row page is separate from the first database page; and
   a storage policy stored in the memory, the storage policy defining when previous version information regarding the previous version of the first row within the first database page is stored in accordance with the in-row scheme and when the previous version information regarding the previous version of the first row within the first database page is stored in accordance with the off-row scheme;
determine a minimum useful transaction identifier for the relational database system;
compare a transaction identifier associated with the first row with the minimum useful transaction identifier; and
delete the previous version information if the transaction identifier is less than the minimum useful transaction identifier.

2. The relational database system of claim 1, wherein the previous version information comprises a difference between the current version of the first row and the previous version of the first row.

3. The relational database system of claim 1, wherein the previous version information comprises the previous version of the first row.

4. The relational database system of claim 1, wherein the storage policy comprises:
at least one in-row scheme rule indicating that the in-row scheme is utilized when a difference between the previous version of the first row and the current version of the first row is less than a defined threshold; and
at least one off-row scheme rule indicating that the off-row scheme is utilized when the difference between the previous version of the first row and the current version of the first row is greater than the defined threshold, or when additional metadata of the row needs to be stored that cannot be stored in the first row.

5. The relational database system of claim 1, further comprising additional instructions that are executable by the one or more processors to delete the previous version information that is no longer needed.

6. The relational database system of claim 5, wherein the off-row page stores a plurality of different instances of the previous version information, wherein the plurality of different instances of the previous version information correspond to different rows, wherein each instance of the previous version information is associated with a different transaction identifier, and wherein the additional instructions are also executable by the one or more processors to:
determine a minimum useful transaction identifier for the relational database system;
determine a maximum transaction identifier for the off-row page;
compare the minimum useful transaction identifier for the relational database system with the maximum transaction identifier for the off-row page; and
deallocate the off-row page if the maximum transaction identifier for the off-row page is less than the minimum useful transaction identifier for the relational database system.

7. The relational database system of claim 1, further comprising:
a plurality of database pages stored in the memory;
at least one page free space (PFS) page stored in the memory, wherein the at least one PFS page comprises a record for each of the plurality of database pages, and wherein the record associated with the first database page indicates whether the first database page is associated with any previous version information stored in the first payload of the first row within the first database page; and instructions stored in the memory, the instructions being executable by the one or more processors to update an indicator corresponding to the first database page when a database transaction produces new previous version information for the first database page.

8. A method for implementing persistent version storage, comprising:
providing a storage policy, wherein the storage policy comprises at least one in-row scheme rule that defines when to store previous version information within a payload of a row of a database page, wherein the at least one in-row scheme rule defines that the previous version information is stored within the payload of the row of the database page when a difference between a previous version of the row and a current version of the row is less than a defined threshold, wherein the row includes the current version of the row, wherein the storage policy further comprises at least one off-row scheme rule that defines when to store the previous version information, wherein the at least one off-row scheme rule defines that the previous version information is stored in an off-row page separate from the database page when the difference between the previous version of the row and the current version of the row is greater than the defined threshold, and wherein the previous version information comprises information regarding the previous version of the row within the database page;
storing the previous version information within the payload of the row of the database page when the at least one in-row scheme rule is satisfied; and
storing the previous version information in the off-row page when the at least one off-row scheme rule is satisfied; and
determining a minimum useful transaction identifier for the relational database system;
comparing a transaction identifier associated with the first row with the minimum useful transaction identifier; and
deleting the previous version information if the transaction identifier is less than the minimum useful transaction identifier.

9. The method of claim 8, wherein the previous version information comprises at least one of:
a difference between the current version of the row and the previous version of the row; or
the previous version of the row.

10. The method of claim 8, wherein:
the at least one off-row scheme rule further defines that the previous version information is stored in an off-row page when additional metadata of the row needs to be stored that cannot be stored in the row.

11. The method of claim 8, further comprising deleting previous version information that is no longer needed.

12. The method of claim 8, further comprising:
determining a minimum useful transaction identifier;
determining a maximum transaction identifier for the off-row page;
comparing the minimum useful transaction identifier with the maximum transaction identifier for the off-row page; and
deallocating the off-row page if the maximum transaction identifier for the off-row page is less than the minimum useful transaction identifier.

13. A relational database system that implements persistent version storage, comprising:
one or more processors;

memory in electronic communication with the one or more processors;

a plurality of database pages stored in the memory;

a storage policy stored in the memory, wherein the storage policy comprises at least one in-row scheme rule that defines when an in-row scheme is utilized to store previous version information, and wherein the storage policy further comprises at least one off-row scheme rule that defines when an off-row scheme is utilized to store the previous version information, wherein the previous version information comprises information regarding a previous version of a row of a database page;

instructions stored in the memory, the instructions being executable by the one or more processors to:
store the previous version information within a payload of the row of the database page in accordance with the in-row scheme when an in-row scheme rule is satisfied; and
store the previous version information in an off-row page in accordance with the off-row scheme when an off-row scheme rule is satisfied, wherein the off-row page is separate from the database page;
determine a minimum useful transaction identifier;
compare a transaction identifier associated with the row with the minimum useful transaction identifier;
delete the previous version information if the transaction identifier is less than the minimum useful transaction identifier; and at least one page free space (PFS) page stored in the memory, wherein the at least one PFS page comprises a record indicating whether the database page contains any previous version information stored in the payload of the row within the database page and wherein the row includes a current version of the row.

14. The relational database system of claim 13, wherein the previous version information comprises at least one of:
a difference between the current version of the row and the previous version of the row; or
the previous version of the row.

15. The relational database system of claim 13, wherein:
the at least one in-row scheme rule indicates that the in-row scheme is utilized when a difference between the previous version of the row and the current version of the row is less than a defined threshold; and
the at least one off-row scheme rule indicates that the off-row scheme is utilized when the difference between the previous version of the row and the current version of the row is greater than the defined threshold, or when additional metadata of the row needs to be stored that cannot be stored in the row.

16. The relational database system of claim 13, wherein the instructions are additionally executable by the one or more processors to delete previous version information that is no longer needed.

17. The relational database system of claim 13, wherein the instructions are additionally executable by the one or more processors to:
store the previous version information within the payload of the row of the database page in accordance with the in-row scheme based on the in-row scheme rule being satisfied;
update the record to indicate that the database page contains the previous version information in the payload of the row within the database page; and
determine, based on the record of the at least one PFS page, that the payload of the row within the database page contains the previous version information.

18. The relational database system of claim 13, wherein the instructions are additionally executable by the one or more processors to:
determine a minimum useful transaction identifier;
determine a maximum transaction identifier for the off-row page;
compare the minimum useful transaction identifier with the maximum transaction identifier for the off-row page; and
deallocate the off-row page if the maximum transaction identifier for the off-row page is less than the minimum useful transaction identifier.

* * * * *